(12) United States Patent
Keerthi (10) Patent No.: US 9,037,164 B2
(45) Date of Patent: May 19, 2015

(54) CHANGING THE ORIENTATION OF A USER BASED AT LEAST IN PART ON TRANSMIT POWER

(75) Inventor: Arvind Vijay Keerthi, Bangalore (IN)

(73) Assignee: Empire Technology Development LLC, Wilmington, DE (US)

(*) Notice: Subject to any disclaimer, the term of this patent is extended or adjusted under 35 U.S.C. 154(b) by 0 days.

(21) Appl. No.: 13/643,957

(22) PCT Filed: Dec. 5, 2011

(86) PCT No.: PCT/IB2011/055443
§ 371 (c)(1),
(2), (4) Date: Oct. 26, 2012

(87) PCT Pub. No.: WO2013/057546
PCT Pub. Date: Apr. 25, 2013

(65) Prior Publication Data
US 2013/0102332 A1    Apr. 25, 2013

(30) Foreign Application Priority Data
Oct. 19, 2011    (IN) .......................... 3584/CHE/2011

(51) Int. Cl.
*H04W 24/00* (2009.01)
*H04W 4/02* (2009.01)
*H04W 8/18* (2009.01)

(52) U.S. Cl.
CPC .............. *H04W 4/026* (2013.01); *H04W 8/183* (2013.01)

(58) Field of Classification Search
USPC ........ 455/414.1, 423, 425, 456.6, 457, 550.1, 455/556.1, 574
See application file for complete search history.

(56) References Cited

U.S. PATENT DOCUMENTS

| 5,675,245 | A  | * | 10/1997 | Millar et al. ..................... 324/95 |
| 6,272,316 | B1 |   | 8/2001  | Wiedeman et al. |
| 2007/0287399 | A1 | * | 12/2007 | Lee ............................ 455/226.2 |
| 2008/0248822 | A1 | * | 10/2008 | Jarvinen et al. ............... 455/509 |
| 2010/0203862 | A1 |   | 8/2010  | Friedlander et al. |
| 2010/0323747 | A1 | * | 12/2010 | Tiedemann, Jr. et al. ..... 455/522 |
| 2012/0116672 | A1 | * | 5/2012  | Forutanpour et al. ......... 701/431 |
| 2012/0150431 | A1 | * | 6/2012  | Ooka ............................ 701/425 |

FOREIGN PATENT DOCUMENTS

WO    9734381 A2    9/1997

OTHER PUBLICATIONS

Hilzfuld, Want to avoid mobile phone radiation? there's now an app for that, Tech N' Marketing, May 18, 2010 via http://technmarketing.com/cellphone/want-to-avoid-mobile-phone-radiation-theres-now-an-app-for-that/.
Lubovsky, Mobile phone radiation, Tawkon, 2011, accessed online on Jul. 25, 2012 via http://www.engineers.org.il/_Uploads/7918AmitLubovski.pdf.
Sani et al., Directional antenna diversity for mobile devices: characterizations and solutions, MobiCom '10, Sep. 20-24, 2010, 221-232, ACM, New York, NY, USA.
Australian Patent Office, International Search Report and Written Opinion of the International Searching Authority for PCT/IB2011/055443, mailed on Mar. 30, 2012.

* cited by examiner

*Primary Examiner* — Charles Appiah
*Assistant Examiner* — Matthew Genack
(74) *Attorney, Agent, or Firm* — Brundidge & Stanger, P.C.

(57) ABSTRACT

Implementations and techniques for changing the orientation of a user of a mobile communication device based at least in part on transmit power are generally discussed. The change in orientation of the user may reduce radiation absorbed by the user.

12 Claims, 10 Drawing Sheets

900 A computer program product.

902 A signal bearing medium.

904 Machine-readable instructions, which, if executed by one or more processors, operatively enable a computing device to:
  determine a first transmit power associated with the mobile handset, wherein the first transmit power is associated with a first orientation of the mobile handset;
  determine an updated transmit power associated with the mobile handset, wherein the updated transmit power is associated with an updated orientation of the mobile handset; and/or
  compare the updated transmit power to the first transmit power; and
  signal the user to further change the orientation of the user with respect to a base station based at least in part on the comparison of the updated transmit power to the first transmit power, wherein the base station is in communication with the mobile handset

| 909 a computer-readable medium. | 908 a recordable medium. | 910 a communications medium. |

CHANGING THE ORIENTATION OF A USER BASED AT LEAST IN PART ON TRANSMIT POWER

CROSS-REFERENCE TO RELATED APPLICATIONS

This Application is the National Stage filing under 35 U.S.C. § 371 of PCT Application Ser. No. PCT/IB2011/055443 filed on Dec. 5, 2011, which claims the benefit of India Application No. 3584/CHE/2011 filed on Oct. 19, 2011. The disclosures of both applications are hereby incorporated herein by reference in their entireties.

BACKGROUND

Unless otherwise indicated herein, the approaches described in this section are not prior art to the claims in this application and are not admitted to be prior art by inclusion in this section.

The head and neck region of cell phone users absorb up to fifty percent of the radiation emitted by cell phones. This absorption, and consequent loss in signal power, may result in reduced call quality. Additionally, the cell phone may typically respond by increasing transmitted power, which may, in turn, increase radiation absorbed by cell phone users. Such radiation absorbed by the head and neck of a user may result in tumors and other diseases.

SUMMARY

Some example methods, apparatus, and systems relate to changing the orientation of a user based at least in part on transmit power.

Some example apparatus and systems related to changing the orientation of a user based at least in part on transmit power may be implemented in a mobile handset configured to facilitate communication in a communication network. Such a mobile handset may include a housing, a processor, an RF transceiver, an antenna, an accelerometer, and two or more vibrating pads. The processor may be located within the housing. The RF transceiver may be operably coupled to the processor. The antenna may be operably coupled to the RF transceiver. The accelerometer may be operably coupled to the processor. The two or more vibrating pads may be located on an exterior of the housing and operably coupled to the processor. The processor may be configured to vibrate one of two or more vibrating pads to indicate a clockwise or counter clockwise directional pivot by a user of the mobile handset.

Such methods may be implemented in a mobile handset for changing the orientation of a user based at least in part on transmit power. Such methods may include determining a first transmit power associated with the mobile handset, where the first transmit power may be associated with a first orientation of the mobile handset. A determination may be made of an updated transmit power associated with the mobile handset, where the updated transmit power may be associated with an updated orientation of the mobile handset. A comparison may be made of the updated transmit power to the first transmit power. A signal may be made to a user to further change the orientation of the user with respect to a base station based at least in part on the comparison of the updated transmit power to the first transmit power, where the base station may be in communication with the mobile handset.

Some example articles may include machine-readable instructions for changing the orientation of a user based at least in part on transmit power. Such machine-readable instructions may include determining a first transmit power associated with the mobile handset, where the first transmit power may be associated with a first orientation of the mobile handset. A determination may be made of an updated transmit power associated with the mobile handset, where the updated transmit power may be associated with an updated orientation of the mobile handset. A comparison may be made of the updated transmit power to the first transmit power. A signal may be made to a user to further change the orientation of the user with respect to a base station based at least in part on the comparison of the updated transmit power to the first transmit power, where the base station may be in communication with the mobile handset.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to changing the orientation of a user based at least in part on transmit power.

There may be reasons to believe that mobile handset radiation absorbed by the head and neck may result in tumors and other diseases. A method that can reduce radiation emitted by mobile handsets may also reduce the chance of disease developing, or at least postpone the development of such disease.

The head and neck region of cell phone users absorb up to fifty percent of the radiation emitted by a mobile handset. This absorption may result in a loss in signal power for the mobile handset. In response to loss in signal power, the mobile handset may typically increase transmitted power, which may further increase the absorbed radiation. By orienting the user correctly, it may be possible to reduce the signal loss through the user. If, by means of proper orientation, a mobile handset is able to transfer more energy to its base station, power control algorithms may bring down the power transmitted by the mobile handset. The benefit of such a lowered transmit power may be a corresponding lower level of radiation exposure to the user.

As will be described in greater detail below, a mobile handset may measure transmitted power as a function of orientation, and encourage the user to change direction (e.g., turn and/or switch ear) in order to reduce radiation absorption in the head. In this way the mobile handset may transfer more energy to a base station and power control algorithms may bring down the power transmitted by the mobile handset. The mobile handset may signal a requested change in orientation to the user (e.g., by vibrating, audio tones, and/or an arrow displayed on screen). For example, a first-type audio tone might indicate a clockwise directional pivot by a user of mobile handset while a second-type audio tone might indicate a counter clockwise directional pivot by a user of mobile handset.

Figure 1:
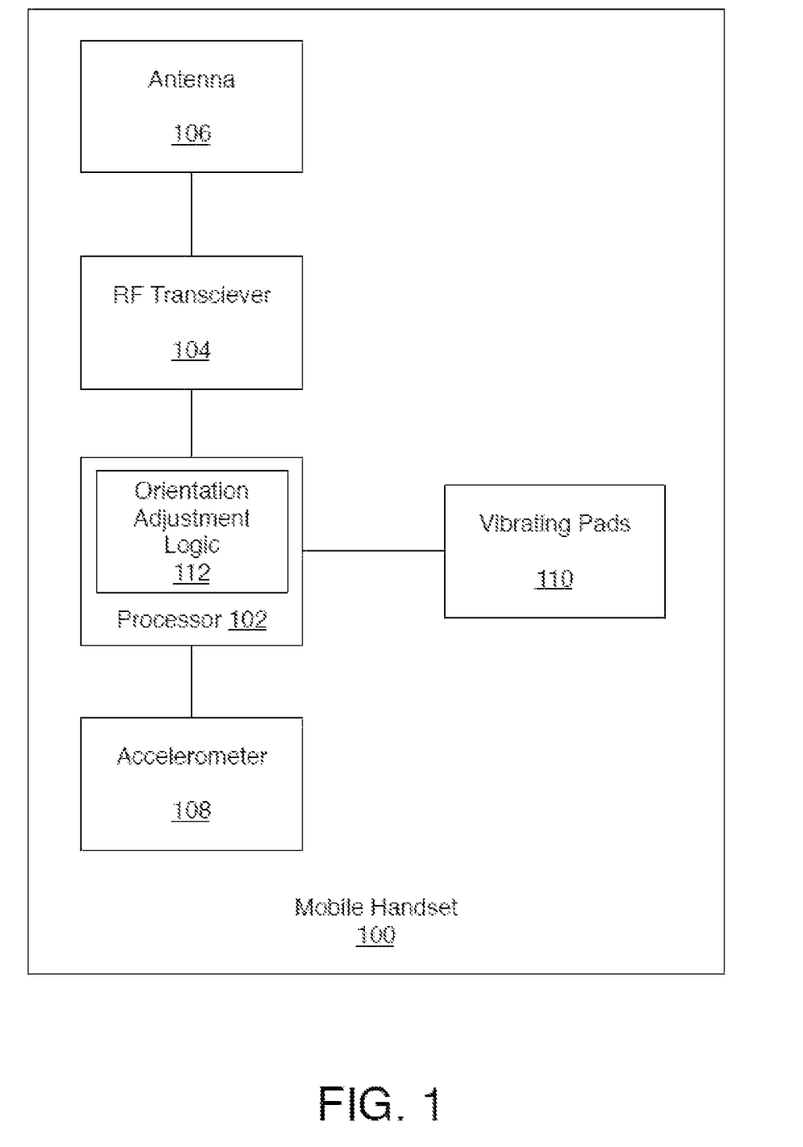
FIG. 1 is a schematic diagram of an example mobile handset that is arranged in accordance with at least some embodiments of the present disclosure.

FIG. 1 is a schematic diagram of an example mobile handset that is arranged in accordance with at least some embodiments of the present disclosure. In the illustrated example, a mobile handset 100 may be configured to facilitate communication in a communication network.

In some examples mobile handset 100 may include a processor 102, an RF transceiver 104, an antenna 106, an accelerometer 108, and/or two or more vibrating pads 110. Further, mobile handset 100 may also include additional items such as a speaker, a display, memory, a router, network interface logic, etc. that have not been shown in FIG. 1 for the sake of clarity.

Processor 102 may be located within a housing (see, e.g., FIG. 2) of mobile handset 100. For example, processor 102 may be a microprocessor or Central Processing Unit (CPU). In other implementations, processor 102 may be an Application Specific Integrated Circuit (ASIC), a Field Programmable Gate Array (FPGA), a digital signal processor (DSP), or other integrated formats.

RF transceiver 104 may be operably coupled to processor 102. RF transceiver 104 may, in some implementations, be a radio frequency-type (RF) transceiver. Also, while RF transceiver 104 is one example of transceiver, claimed subject matter is not limited in this regard and mobile handset 100 may, for example, employ a distinct RF receiver and RF transmitter circuitry.

Antenna 106 may be operably coupled to RF transceiver 104. Antenna 106 may be any suitable antenna, including but not limited to loop, dish, parabolic, panel, sector, directional, omnidirectional, etc.

Accelerometer 108 may be operably coupled to processor 102. Accelerometer 108 may be configured to determine an orientation of a user with respect to the mobile device 100. For example, accelerometer 108 may be configured to judge the side of the face to which mobile handset 100 is being pressed. Similarly, accelerometer 108 may be configured to judge a rotational orientation of the user and/or the orientation of the mobile handset to a base station.

Two or more vibrating pads 110 may be operably coupled to processor 102. Processor 102 may be configured to vibrate one of two or more vibrating pads 110 to indicate a clockwise or counter clockwise directional pivot by a user of mobile handset 100.

As will be discussed in greater detail below, mobile handset 100 may be used to perform some or all of the various functions discussed below in connection with FIG. 8. For example, Mobile handset 100 may also include orientation adjustment logic 112 that may be configured to undertake any of the operations of FIG. 8, as will be discussed in further detail below. Orientation adjustment logic 112 may provide any of the functionality described herein and claimed subject matter is not limited to specific types or manifestations of processing logic.

Figure 2:
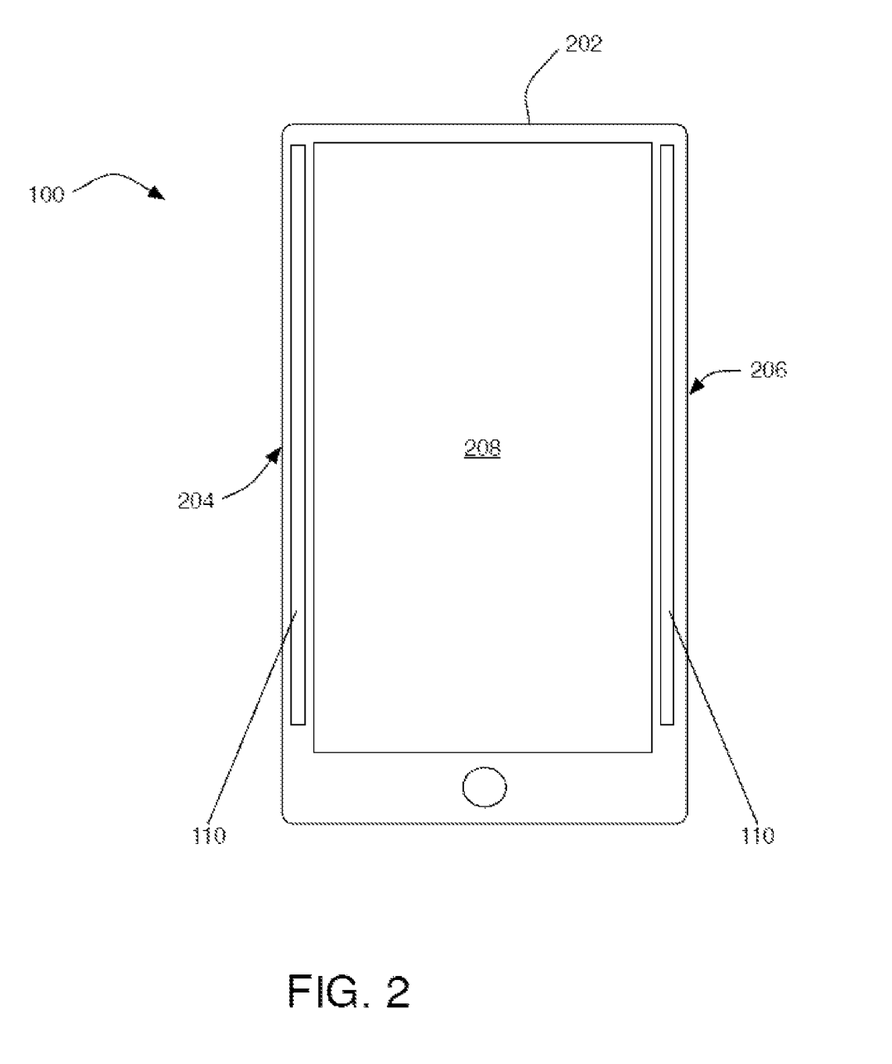
FIG. 2 is a top view of an example mobile handset that is arranged in accordance with at least some embodiments of the present disclosure.

FIG. 2 is a top view of an example mobile handset that is arranged in accordance with at least some embodiments of the present disclosure. In the illustrated example, mobile handset 100 may be configured to facilitate communication in a communication network. In some examples mobile handset 100 may include a housing 202. Two or more vibrating pads 110 may be located on the inner surface of an exterior of housing 202.

For example, one of vibrating pads 110 may have an elongated shape and be positioned adjacent on a left hand portion 204 of mobile handset 100. Similarly, one of vibrating pads 110 may have an elongated shape and be positioned adjacent on a right hand portion 206 of mobile handset 100. Such dual vibrating pads 110 may alert the user into rotating clock-wise or anti-clock-wise. Such a system of dual vibrating pads 110 may be a discreet way to get the user to change orientation.

In operation, mobile handset 100 may signal a requested change in orientation by vibrating one of vibrating pads 110. For example, a North-facing user with the screen facing West (i.e., phone is on the user's right ear) may be made to turn and face East by vibrating only the rear one of vibrating pads 110. In some examples, a greater amount of vibration (e.g., higher vibration and/or a greater number of repeated vibration pulses) could signal a request to change by a larger angle and a smaller amount of vibration (e.g., a lower vibration and/or a lesser number of repeated vibration pulses) could signal a request to change by a smaller angle.

Additionally or alternatively, mobile handset 100 may indicate direction of orientation-change by means of a visual display (e.g. a directional arrow) displayed on a screen 208. Such a visual display may be useful when the user is on speakerphone or on wireless headphone, and still wants to optimize direction so as to reduce radiation exposure.

Figure 3:
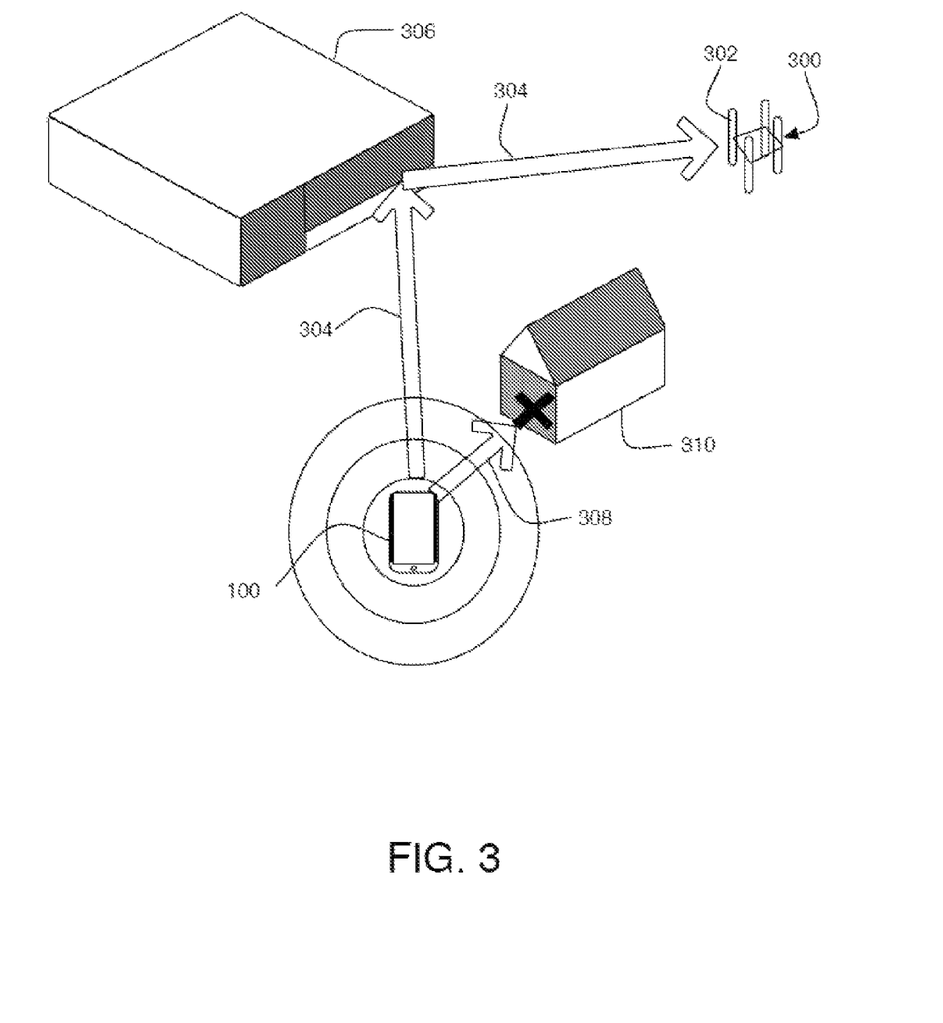
FIG. 3 is a perspective view that illustrates an example of scattering that is arranged in accordance with at least some embodiments of the present disclosure.

FIG. 3 is a perspective view that illustrates an example of scattering that indicates that the radio path from mobile to base station need not necessarily be a straight-line between mobile and base-station. Mobile handset 100 may be capable of discovering an orientation that represents strongest radio path and accordingly advise the user to adjust body or head orientation. In the illustrated example, a base station 302 portion of a communication network 300 routes communications to and from mobile handset 100 via a radio path 304 that experiences one reflective scatterer 306.

As used herein the term "communication network" may refer to any number of communication systems including a plurality of mobile handsets adapted for wireless communication with one another via the communication network. For example, communication network 300 may refer to any number of communication systems including one or more of the following: a cellular phone network, a mobile worldwide interoperability for microwave access network (WiMax), voice over Internet protocol (VoIP) system (e.g., via a wireless local area network (WLAN), a wireless wide area network (WWAN)), Long Term Evolution network (LTE), Orthogonal Frequency-Division Multiple Access network (OFDMA), the like, and/or combinations thereof, according to the particular application. Additionally or alternatively, such a communication network 300 may refer to any number of communication systems that provide Internet access to a plurality of mobile handsets.

Communication network 300 is presented herein purely for illustrative purposes and it may be recognized that communication network 300 may have additional components that have not been depicted in FIG. 3 in the interest of clarity. Accordingly, communication network 300 may include any number of components that are not illustrated here, such as one or more base stations 302, base station controllers, mobile switching center, the like, and/or combinations thereof. As used herein the term "base station" may refer to a portion of communication network 300 that is configured to facilitate communication among a plurality of mobile devices.

Mobile handset 100 may be arranged (e.g., coupled) in communication with base station 302 portion of communication network 300. As used herein the term "mobile handset" may refer to mobile devices such as a cell phone, a personal data assistant (PDA), the like, and/or combinations thereof, for example.

In the illustrated example, outdoor scattering may permit mobile handset 100 to bounce a signal 304 off of one or more scattering objects 306 (such as buildings or the like) to base station 302. For example, a signal 308 that travels a direct path to base station 302 may be obstructed by a scattering object 310.

Figure 4:
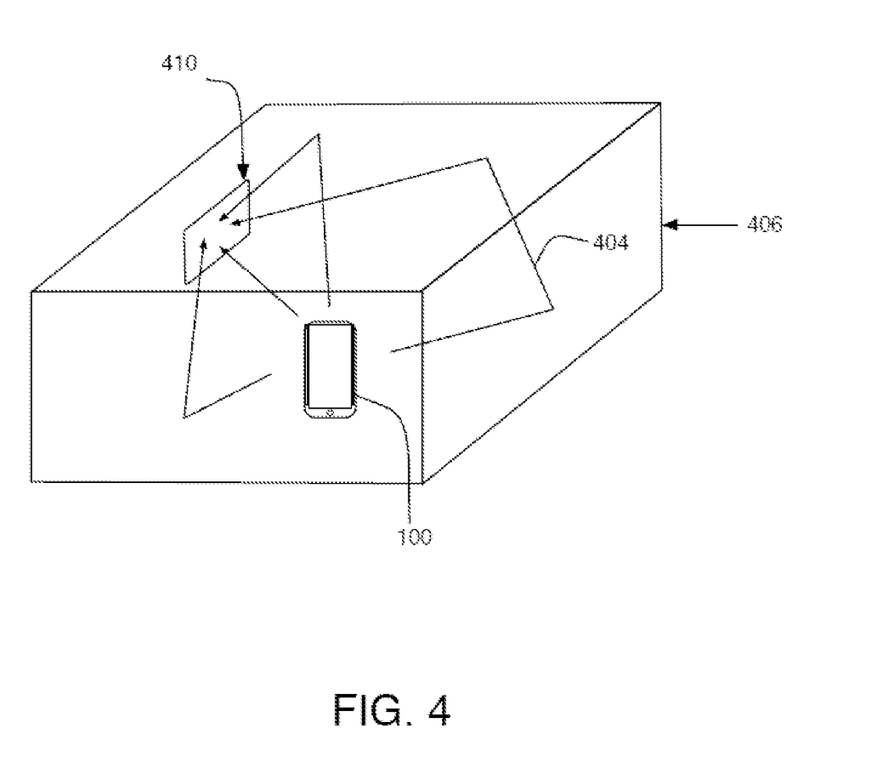
FIG. 4 is a perspective view that illustrates another example of scattering that is arranged in accordance with at least some embodiments of the present disclosure.

FIG. 4 is a perspective view that illustrates another example of scattering that may be faced by the radio signal traversing the distance between mobile handset 100 and base station 302 (e.g., see FIG. 3). In the illustrated example, indoor scattering may permit mobile handset 100 to bounce a signal 404 off of one or more scattering objects 406 (such as walls or the like) to non-scattering object 410 (such as a window, for example). For example, when a user is indoors, almost all the radiation generated by mobile handset 100 may be reflected off of walls, so that the only exit is through a window, or the like. In such a case, the mobile handset 100 may be capable of advising the user to orient mobile handset 100 toward non-scattering object 410.

Figure 5:
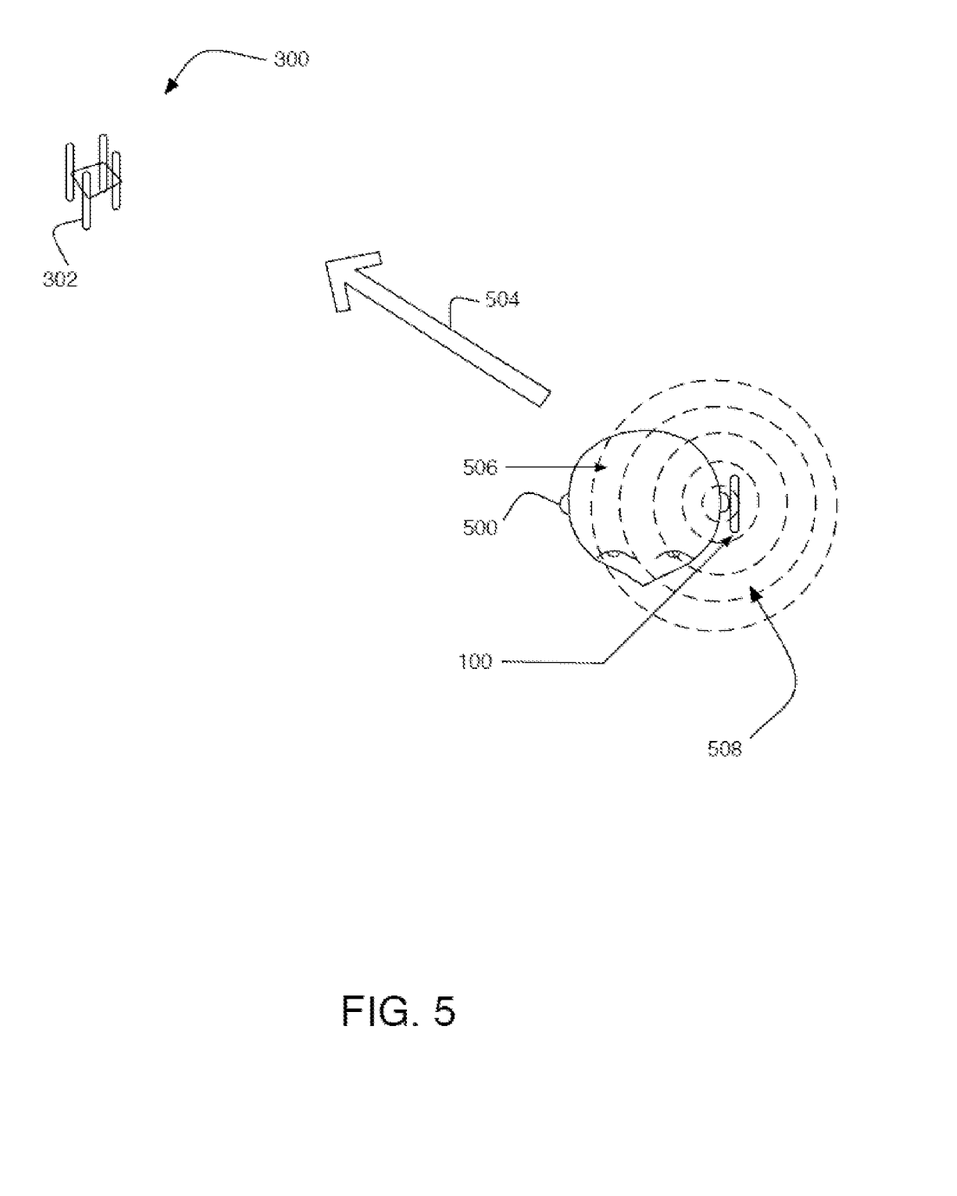
FIG. 5 is a perspective view that illustrates an increased exposure of a user to radiation via a mobile handset that is arranged in accordance with at least some embodiments of the present disclosure.

FIG. 5 is a perspective view that illustrates an increased exposure of a user to radiation via a mobile handset that is arranged in accordance with at least some embodiments of the present disclosure. In the illustrated example, the orientation of a user 500 may impact the level of radiation generated by mobile handset 100. For example, user 500 may be oriented to position mobile handset 100 so that a signal 504 cannot pass in the most direct manner to base station 302 portion of communication network 300. In the illustrated example, user 500 may be oriented to position mobile handset 100 so that a portion of radiation 506 absorbed by user 500 and/or a portion of radiation 508 lost in space are larger than would be the case were mobile handset 100 more advantageously positioned. In cases where portion of radiation 506 absorbed by user 500 and/or portion of radiation 508 lost in space are increased, mobile handset 100 must also increase transmit power (and a corresponding increase in overall radiation output) to maintain the same signal strength for signal 504.

Figure 6:
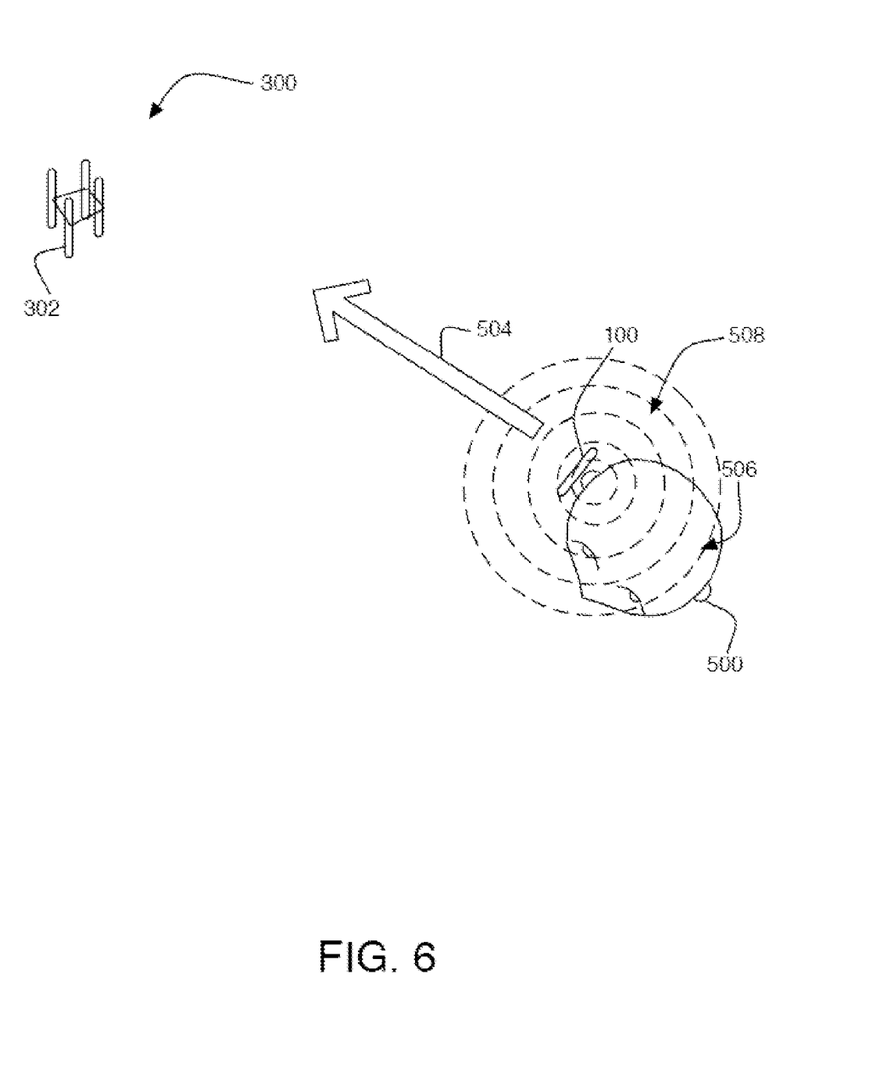
FIG. 6 is a perspective view that illustrates a decreased exposure of a user to radiation via a mobile handset that is arranged in accordance with at least some embodiments of the present disclosure.

FIG. 6 is a perspective view that illustrates a decreased exposure of a user to radiation via a mobile handset that is arranged in accordance with at least some embodiments of the present disclosure. In the illustrated example, the orientation of a user 500 may impact the level of radiation generated by mobile handset 100. For example, user 500 may be oriented to position mobile handset 100 so that a signal 504 can pass in the most direct manner to base station 302 portion of communication network 300. In the illustrated example, user 500 may be oriented to position mobile handset 100 so that a portion of radiation 506 absorbed by user 500 and/or a portion of radiation 508 lost in space are minimized. In cases where portion of radiation 506 absorbed by user 500 and/or portion of radiation 508 lost in space are minimized, mobile handset 100 may also decrease transmit power (and a corresponding decrease in overall radiation output) to maintain the same signal strength for signal 504.

In operation, mobile handset 100 may be configured to vibrate one of two or more vibrating pads 110 (see, e.g., FIG. 2) to indicate a clockwise or counter clockwise directional pivot by user 500 of mobile handset 100. For example, mobile handset 100 may determine a first transmit power associated with mobile handset 100, where the first transmit power may be associated with a first orientation of mobile handset 100. A determination may be made of an updated transmit power associated with mobile handset 100, where the updated transmit power may be associated with an updated orientation of mobile handset 100. A comparison may be made of the updated transmit power to the first transmit power. A signal (such as via vibrating pads 110, for example, see, e.g., FIG. 2) may be made to user 500 to further change the orientation of user 500 with respect to base station 302 based at least in part on the comparison of the updated transmit power to the first transmit power.

Figure 7:
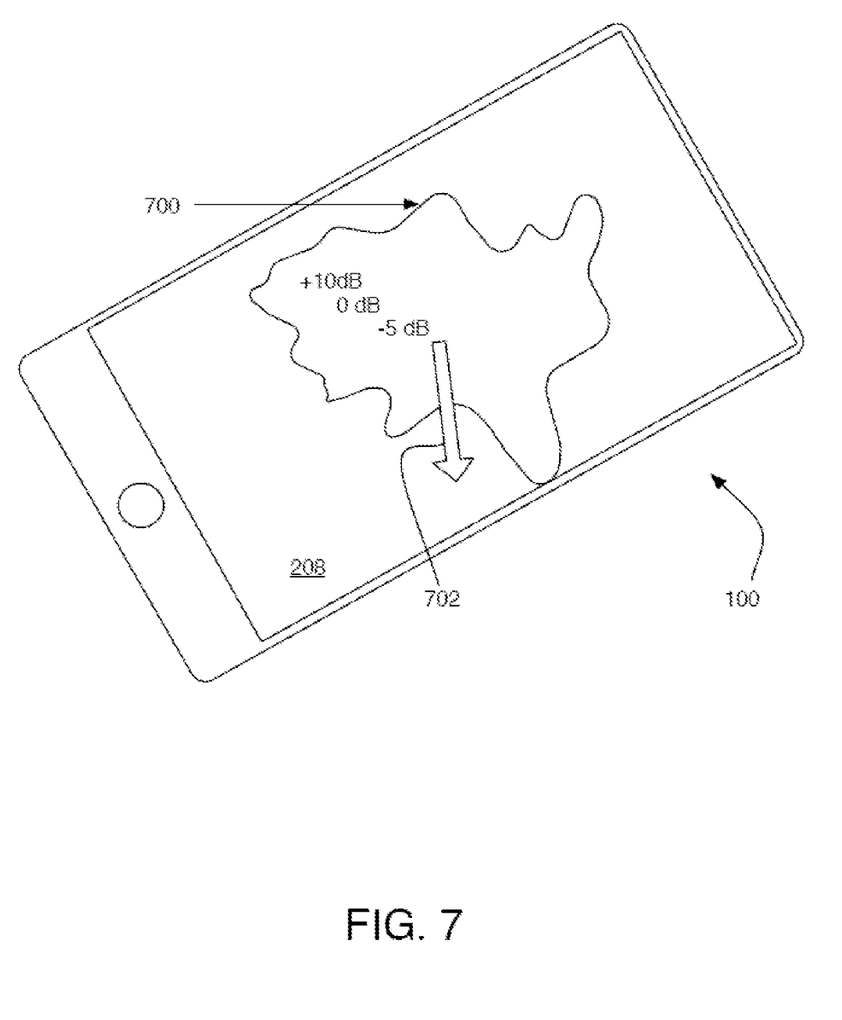
FIG. 7 is a perspective view that illustrates an example mobile handset displaying a map of transmit power versus orientation that is arranged in accordance with at least some embodiments of the present disclosure.

FIG. 7 is a perspective view that illustrates an example mobile handset displaying a map of transmit power versus orientation that is arranged in accordance with at least some embodiments of the present disclosure. In the illustrated example, mobile handset 100 may display a map 700. For example, mobile handset 100 may map transmit power for two or more orientations at a given geographical location. In some examples, transmit power may be mapped against orientation for every (or for several) previously traversed geographical locations (e.g., a given latitude and longitude). Map 700 may indicate direction of orientation-change (e.g., a recommended orientation associated with a reduced transmit power) by means of a visual display (e.g. a directional arrow 702 or the like) displayed on screen 208.

In operation, mobile handset 100 may keep a record of the transmit power versus orientation for individual locations at which a phone call is made. The location may be determined by on-board GPS and/or other sensors (or supplied to mobile handset 100 from the communication network). For example, other sensors may include one or more of the following sensors: altimeter-type sensors, accelerometer-type sensors, the like, and/or combinations thereof. The orientation may be determined by the on-board accelerometer 108 (see, e.g., FIG. 1). After several phone calls and concomitant measurements, mobile handset 100 may produce (at least for a previously used location), map 700 of transmit power versus orientation along with a recommended orientation (e.g. directional arrow 702 or the like). With map 700 displayed, the user may hold mobile handset 100 parallel to the ground to realize what direction the user should be facing when commencing or answering a phone call.

Figure 8:
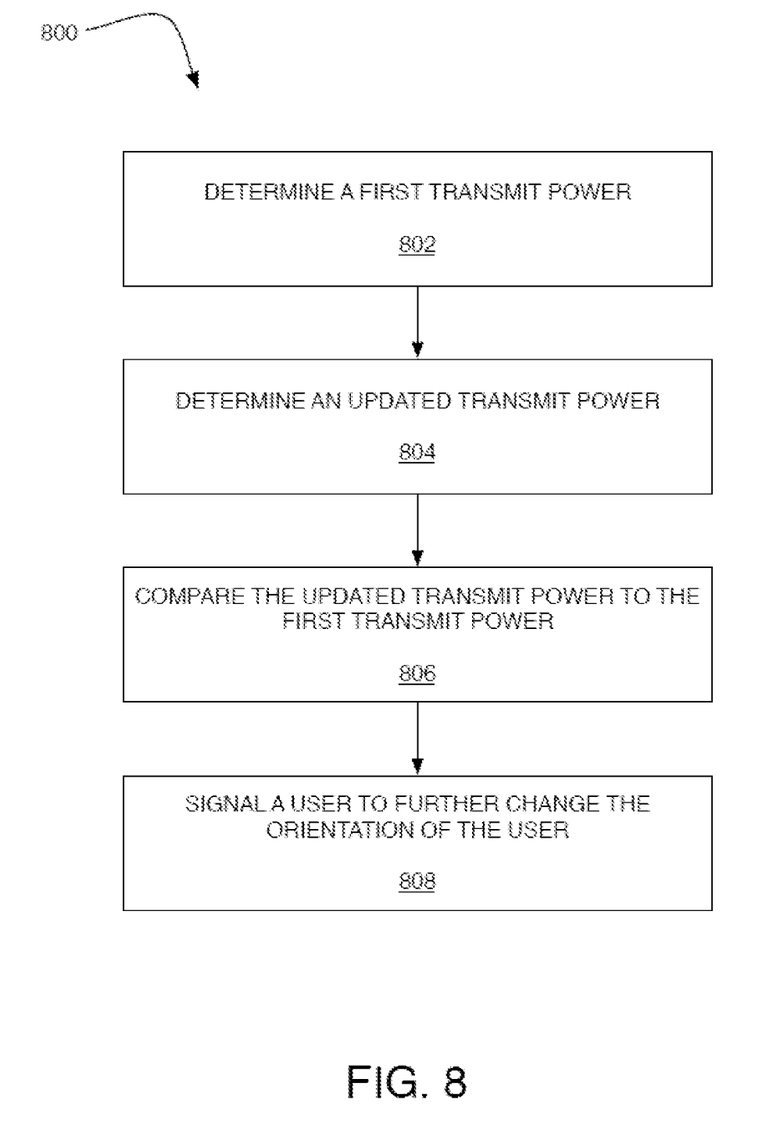
FIG. 8 illustrates an example process for changing the orientation of a user based at least in part on transmit power that is arranged in accordance with at least some embodiments of the present disclosure.

FIG. 8 illustrates an example process for changing the orientation of a user based at least in part on transmit power that is arranged in accordance with at least some embodiments of the present disclosure. Process 800, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 8 may be practiced in various implementations. For example, although process 800, as shown in FIG. 8, may comprise one particular order of blocks or actions, the order in which these blocks or actions are presented does not necessarily limit claimed subject matter to any particular order. Likewise, intervening actions not shown in FIG. 8 and/or additional actions not shown in FIG. 8 may be employed and/or some of the actions shown in FIG. 8 may be eliminated, without departing from the scope of claimed subject matter. Process 800 may include one or more of functional operations as indicated by example operations 802, 804, 806, and/or 808.

As illustrated, process 800 may be implemented for changing the orientation of a user based at least in part on transmit power. Processing may begin at operation 802, "DETERMINE A FIRST TRANSMIT POWER", where a first transmit power may be determined. For example, such first transmit power associated with a mobile handset may be determined via the mobile handset. Such a first transmit power may be associated with a first orientation of the mobile handset. For example, such the mobile handset may determine the first orientation of the mobile handset via an accelerometer and associate the first orientation with the determined first transmit power.

As used herein the term "orientation of the mobile handset" may include an orientation of the mobile handset to the user and/or the orientation of the mobile handset to the base station. For example, the orientation of the mobile handset may be relative to the user and/or relative to the base station (e.g., the user's head obstructing the mobile handset—base station line of sight, as illustrated in FIG. 5). In some examples a change in orientation may be accomplished by turning the user's body and/or by changing ear used for the phone conversation.

Processing may continue from operation 802 to operation 804, "DETERMINE AN UPDATED TRANSMIT POWER", where an updated transmit power may be determined. For example, such an updated transmit power associated with the mobile handset may be determined via the mobile handset. Such an updated transmit power may be associated with an updated orientation of the mobile handset. For example, such the mobile handset may determine the updated orientation of the mobile handset via an accelerometer and associate the updated orientation with the determined updated transmit power.

In some examples, the mobile handset may signal the user to change the orientation of the user with respect to the base station prior to the determination of the updated transmit power. In such an example, the signaling the user may include vibrating one of two or more vibrating pads (or other signaling) to indicate a clockwise or counter clockwise directional pivot by the user of the mobile handset.

In some examples, if the user ignores a request to change orientation then the mobile handset may assume that the user is too engrossed in the call to participate in optimizing orientation, and may altogether stop issuing orientation-changing requests. For example, process 800 may stop issuing orientation-changing requests for a period of time and/or for a given call.

In some examples, transmit power may be determined in situations where the mobile handset responds to rapid fading. For example, the duration of a fade may typically be faster than one hundred and fifty milliseconds. If the transmit power is averaged over one and a half seconds (e.g., ten or more fade cycles) then a relatively accurate idea of transmit power may be obtained, for example. Accordingly, orientation-change commands may be issued slower than would be impacted by rapid fading (e.g., slower than once every one and a half seconds).

Processing may continue from operation 804 to operation 806, "COMPARE THE UPDATED TRANSMIT POWER TO THE FIRST TRANSMIT POWER", where the updated transmit power may be compared to the first transmit power. For example, the updated transmit power may be compared to the first transmit power via the mobile handset.

Processing may continue from operation 806 to operation 808, "SIGNAL A USER TO FURTHER CHANGE THE ORIENTATION OF THE USER", where a user may be signaled to further change the orientation of the user. For example, a user may be signaled to further change the orientation of the user with respect to a base station via the mobile handset. Such signal to change the orientation of the user may be based at least in part on the comparison of the updated transmit power to the first transmit power. In cases where the updated transmit power may be lower the first transmit power, the user may be signaled to continue orientation change in same direction. In cases where the updated transmit power may be higher than the first transmit power, the user may be signaled to reverse direction of orientation change. Process 800 may repeat operations 804-808 until a global minimum or a local minimum transmit power is determined and/or until a preset number of signals to user have been delivered.

Additionally or alternatively, the mobile handset may determine a first geographical location of the mobile handset associated with the first and updated transmit power. The mobile handset may map the first and updated transmit power versus the first and updated orientation associated with the first geographical location of the mobile handset. Such a mapped first and updated transmit power versus the first and updated orientation may be displayed via the mobile handset. The mapped first and updated transmit power versus the first and updated orientation may include an indication of a recommended orientation associated with a reduced transmit power.

In operation, process 800 ties absorbed radiation to transmit power, which is a relatively simple quantity to extract from a mobile handset. Process 800 may call upon the mobile handset to measure transmit power as a function of orientation, and encourage the user to change orientation (e.g., the direction the user faces and/or by switching ears) in order to reduce absorption in the head.

In some examples, radiation may be reduced via orientation change even if the mobile handset is not held next to the head (e.g., as when in speaker-phone/headphone or data mode). In such an example, a user may experience less radiation through the torso, and therefore may still benefit from an orientation change, even if the user is already on speaker-phone.

In some examples, a user may sometimes have no choice but to transmit large amounts of power. For example, a user may be sending large amounts of data, or may not be able to change location. In such an example, even within the given user's situational constraints, process 800 may determine how best to rotate the user to minimize transmit power.

Figure 9:
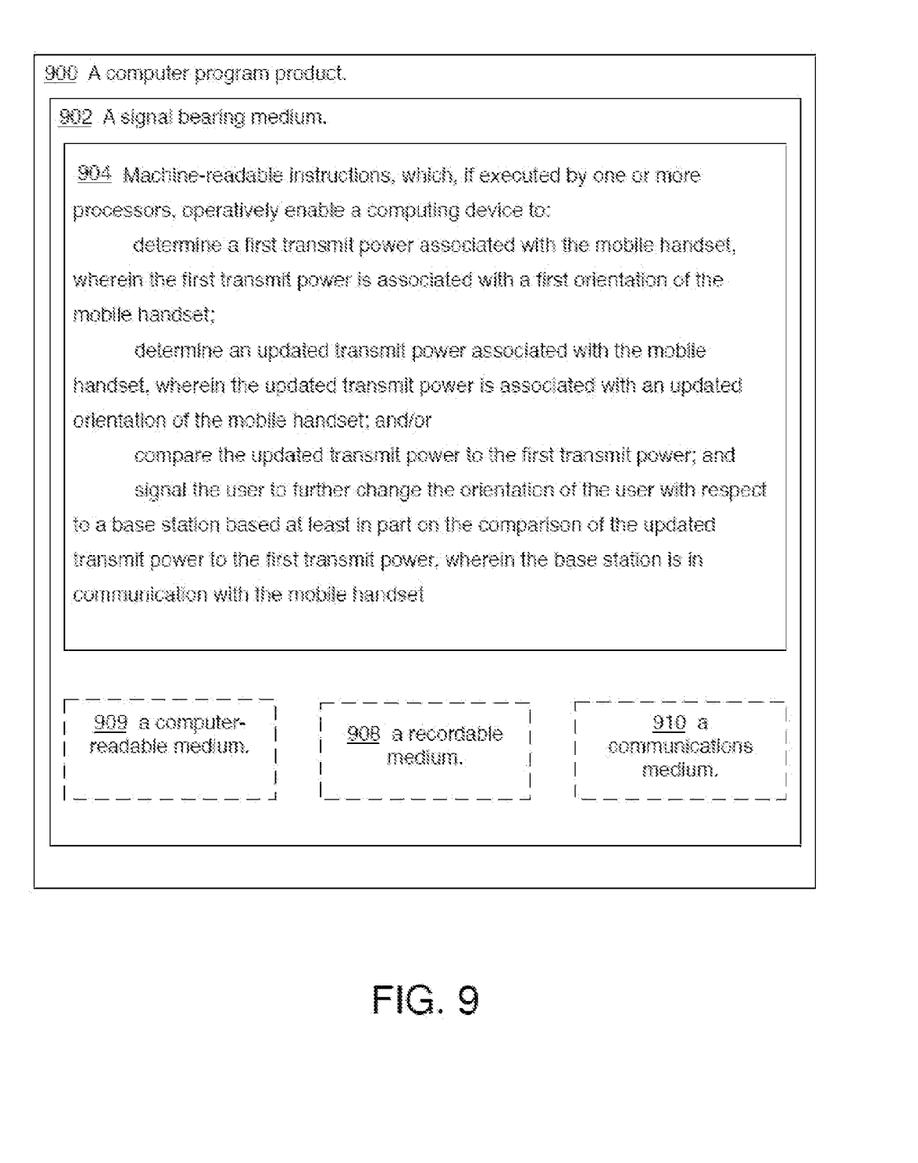
FIG. 9 is an illustration of an example computer program product that is arranged in accordance with at least some embodiments of the present disclosure.

FIG. 9 illustrates an example computer program product 900 that is arranged in accordance with at least some examples of the present disclosure. Program product 900 may include a signal bearing medium 902. Signal bearing medium 902 may include one or more machine-readable instructions 904, which, if executed by one or more processors, may operatively enable a computing device to provide the functionality described above with respect to FIG. 2. Thus, for example, referring to the system of FIG. 1 one or more mobile handsets may undertake one or more of the actions shown in FIG. 8 in response to instructions 904 conveyed by medium 902.

In some implementations, signal bearing medium 902 may encompass a non-transitory computer-readable medium 909, such as, but not limited to, a hard disk drive, a Compact Disc (CD), a Digital Versatile Disk (DVD), a digital tape, memory, etc. In some implementations, signal bearing medium 902 may encompass a recordable medium 908, such as, but not limited to, memory, read/write (R/W) COs, R/W DVDs, etc. In some implementations, signal bearing medium 902 may encompass communications medium 910, such as, but not limited to, a digital and/or an analog communication medium (e.g., a fiber optic cable, a waveguide, a wired communications link, a wireless communication link, etc.).

Figure 10:
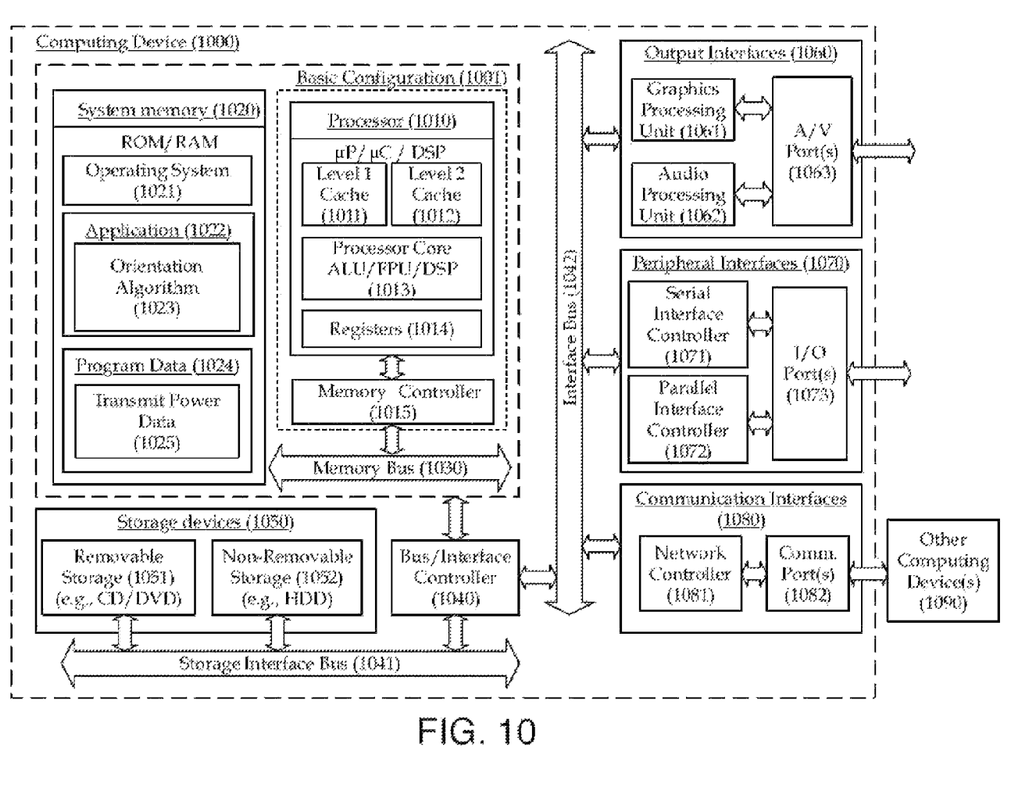
FIG. 10 is a block diagram of an illustrative embodiment of a computing device arranged in accordance with at least some embodiments of the present disclosure.

FIG. 10 is a block diagram illustrating an example computing device 1000, such as might be embodied by a person skilled in the art, which is arranged in accordance with at least some embodiments of the present disclosure. In one example configuration 1001, computing device 1000 may include one or more processors 1010 and system memory 1020. A memory bus 1030 may be used for communicating between the processor 1010 and the system memory 1020.

Depending on the desired configuration, processor 1010 may be of any type including but not limited to a microprocessor (µP), a microcontroller (µC), a digital signal processor (DSP), or any combination thereof. Processor 1010 may include one or more levels of caching, such as a level one cache 1011 and a level two cache 1012, a processor core 1013, and registers 1014. The processor core 1013 may include an arithmetic logic unit (ALU), a floating point unit (FPU), a digital signal processing core (DSP Core), or any combination thereof. A memory controller 1015 may also be used with the processor 1010, or in some implementations the memory controller 1015 may be an internal part of the processor 1010.

Depending on the desired configuration, the system memory 1020 may be of any type including but not limited to volatile memory (such as RAM), non-volatile memory (such as ROM, flash memory, etc.) or any combination thereof. System memory 1020 may include an operating system 1021, one or more applications 1022, and program data 1024. Application 1022 may include an orientation algorithm 1023 that is arranged to perform the functions as described herein including the functional blocks and/or actions described with respect to process 800 of FIG. 8. Program Data 1024 may include transmit power data 1025 for use with orientation algorithm 1023. In some example embodiments, application 1022 may be arranged to operate with program data 1024 on an operating system 1021 such that implementations of changing the orientation of a user based at least in part on transmit power may be provided as described herein. For example, one or more mobile handsets 100 and/or communication network 300 may comprise all or a portion of computing device 1000 and be capable of performing all or a portion of application 1022 such that implementations of changing the orientation of a user based at least in part on transmit power may be provided as described herein. This described basic configuration is illustrated in FIG. 10 by those components within dashed line 1001.

Computing device 1000 may have additional features or functionality, and additional interfaces to facilitate communications between the basic configuration 1001 and any required devices and interfaces. For example, a bus/interface controller 1040 may be used to facilitate communications between the basic configuration 1001 and one or more data storage devices 1050 via a storage interface bus 1041. The data storage devices 1050 may be removable storage devices 1051, non-removable storage devices 1052, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1020, removable storage 1051 and non-removable storage 1052 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1000. Any such computer storage media may be part of device 1000.

Computing device 1000 may also include an interface bus 1042 for facilitating communication from various interface devices (e.g., output interfaces, peripheral interfaces, and communication interfaces) to the basic configuration 1001 via the bus/interface controller 1040. Example output interfaces 1060 may include a graphics processing unit 1061 and an audio processing unit 1062, which may be configured to communicate to various external devices such as a display or speakers via one or more A/V ports 1063. Example peripheral interfaces 1070 may include a serial interface controller 1071 or a parallel interface controller 1072, which may be configured to communicate with external devices such as input devices (e.g., keyboard, mouse, pen, voice input device, touch input device, etc.) or other peripheral devices (e.g., printer, scanner, etc.) via one or more I/O ports 1073. An example communication interface 1080 includes a network controller 1081, which may be arranged to facilitate communications with one or more other computing devices 1090 over a network communication via one or more communication ports 1082. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 1000 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 1000 may also be implemented as a personal computer including both laptop computer and non-laptop computer configurations. In addition, computing device 1000 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A method, comprising:
   measuring, by a mobile handset, a first transmit power of the mobile handset, wherein the first transmit power is associated with a first orientation of the mobile handset;
   signaling, via the mobile handset, a user of the mobile handset to change an orientation of the user with respect to a macro base station;
   measuring, by the mobile handset, an updated transmit power of the mobile handset, wherein the updated transmit power is associated with an updated orientation of the mobile handset;
   comparing, via the mobile handset, the updated transmit power to the first transmit power; and
   signaling, via the mobile handset, by vibrating one of two or more vibrating pads to indicate a clockwise or counter clockwise directional pivot by the user of the mobile handset, the user to further change the orientation of the user with respect to the macro base station based at least in part on the comparison of the updated transmit power to the first transmit power, and an amount of the vibration signaling an amount of the changing of the orientation,
   wherein the macro base station is in communication with the mobile handset, and
   wherein the signaling the user to further change the orientation of the user with respect to the macro base station includes signaling the user to continue orientation change in a same direction when the updated transmit power is lower than the first transmit power.

2. The method of claim 1, further comprising:
   determining, via the mobile handset, the first orientation of the mobile handset associated with the first transmit power; and
   determining, via the mobile handset, the updated orientation of the mobile handset associated with the updated transmit power.

3. The method of claim 1, further comprising determining, via the mobile handset, a first geographical location of the mobile handset associated with the first and updated transmit powers.

4. The method of claim 1, further comprising:
   determining, via the mobile handset, the first orientation of the mobile handset associated with the first transmit power;
   determining, via the mobile handset, the updated orientation of the mobile handset associated with the updated transmit power;
   determining, via the mobile handset, a first geographical location of the mobile handset associated with the first and updated transmit power; and
   mapping the first and updated transmit powers versus the first and updated orientations associated with the first geographical location of the mobile handset.

5. The method of claim 1, further comprising:
   determining, via the mobile handset, the first orientation of the mobile handset associated with the first transmit power;
   determining, via the mobile handset, the updated orientation of the mobile handset associated with the updated transmit power;
   determining, via the mobile handset, a first geographical location of the mobile associated with the first and updated transmit powers;
   mapping, via the mobile handset, the first and updated transmit powers versus the first and updated orientations associated with the first geographical location of the mobile handset; and
   displaying, via the mobile handset, the mapped first and updated transmit powers versus the first and updated orientations, wherein the mapped first and updated transmit powers versus the first and updated orientations includes an indication of a recommended orientation associated with a reduced transmit power.

6. The method of claim 1, wherein the orientation of the mobile handset includes an orientation of the mobile handset of the users.

7. The method of claim 1, wherein the orientation of the mobile handset includes an orientation of the mobile handset to the macro base station.

8. The method of claim 1, wherein the orientation of the mobile handset includes an orientation of the mobile handset to the user and the orientation of the mobile handset to the macro base station.

9. An article comprising:
   a non-transitory signal-bearing medium comprising machine-readable instructions stored thereon, which, if executed by one or more processors, operatively enable a computing device to:
   measure, by a mobile handset, a first transmit power of the mobile handset, wherein the first transmit power is associated with a first orientation of the mobile handset;
   signal a user of the mobile handset to change an orientation of the user with respect to a macro base station;
   measure, by the mobile handset, an updated transmit power of the mobile handset, wherein the updated transmit power is associated with an updated orientation of the mobile handset;
   compare the updated transmit power to the first transmit power; and
   signal, by a vibration of one of two or more vibrating pads to indicate a clockwise or counter clockwise directional pivot by the user of the mobile handset, the user to further change the orientation of the user with respect to the macro base station based at least in part on the comparison of the updated transmit power to the first transmit power, and an amount of the vibration signaling an amount of the changing of the orientation, wherein the macro base station is in communication with the mobile handset, and wherein the signaling the user to further change the orientation of the user with respect to the macro base station includes signaling the user to continue orientation change in a same direction when the updated transmit power is lower than the first transmit power.

10. The article of claim 9, wherein the machine-readable instructions further operatively enable a computing device to:
    determine a first orientation of the mobile handset associated with a first transmit power;
    determine an updated orientation of the mobile handset associated with an updated transmit power;
    determine a first geographical location of the mobile handset associated with the first and updated transmit powers; and map the first and updated transmit powers versus the first and updated orientations associated with the first geographical location of the mobile handset.

11. The article of claim 9, wherein the machine-readable instructions further operatively enable a computing device to:
- determine a first orientation of the mobile handset associated with a first transmit power;
- determine an updated orientation of the mobile handset associated with an updated transmit power;
- determine a first geographical location of the mobile handset associated with the first and updated transmit powers;
- map the first and updated transmit powers versus the first and updated orientations associated with the first geographical location of the mobile handset; and
- display the mapped first and updated transmit powers versus the first and updated orientations, wherein the mapped first and updated transmit powers versus the first and updated orientations includes an indication of a recommended orientation associated with a reduced transmit power.

12. The article of claim 9, wherein the orientation of the mobile handset includes an orientation of the mobile handset to the user and the orientation of the mobile handset to the macro base station.

* * * * *